Figure 5:
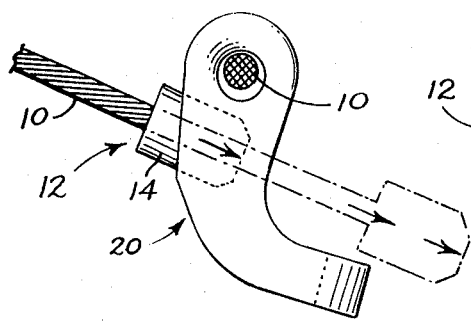

United States Patent
Wernsing

[15] 3,683,465
[45] Aug. 15, 1972

[54] TWO-WAY CHOKER HOOK

[72] Inventor: Kenneth L. Wernsing, 1931 N.E. 72nd Ave., Portland, Oreg. 97213

[22] Filed: July 22, 1970

[21] Appl. No.: 64,851

[52] U.S. Cl. ............................................24/123 A
[51] Int. Cl. ...........................................A44b 11/00
[58] Field of Search .......................24/123 A, 123 D

[56] References Cited

UNITED STATES PATENTS

| | | | |
|---|---|---|---|
| 2,881,496 | 4/1959 | Wernsing | 24/123 D |
| 2,905,993 | 9/1959 | Wernsing | 24/123 A |
| 2,251,319 | 8/1941 | Brewer | 24/123 A |
| 2,233,083 | 2/1941 | Mackenzie | 24/123 D |
| 1,381,616 | 6/1921 | Buckley | 221/123 A |
| 1,391,457 | 9/1921 | Nadeau | 24/123 A |
| 1,464,162 | 8/1923 | Wirkkala | 24/123 D |
| 1,651,081 | 11/1927 | Bardon | 24/123 A |
| 3,058,184 | 10/1962 | Ritzheimer | 24/123 A |
| 3,175,264 | 3/1965 | Maras | 24/123 A |

Primary Examiner—Bernard A. Gelak
Attorney—Eugene D. Farley

[57] ABSTRACT

A two-way choker hook comprises a slip sleeve dimensioned to receive a ferruled choker cable and a socket dimensioned to receive the ferrule. The socket has an eye which passes the ferrule and a communicating slot which passes the cable, but not the ferrule. These are arranged to permit entry of the ferrule either endwise through the eye, or sidewise through the eye and associated slot when seating the ferrule in the socket, thereby facilitating application of the hook.

1 Claim, 7 Drawing Figures

PATENTED AUG 15 1972

3,683,465

Kenneth L. Wernsing
INVENTOR
BY Eugene P. Farley
Atty.

TWO-WAY CHOKER HOOK

This invention relates to choker hooks such as are employed in logging and other operations where a line is cinched about an object to be transported.

It is conventional practice in logging to provide a choker line having an eye at one of its ends and a ferrule at the other. A choker hook is mounted slidably between the ends of the line. It includes a slip sleeve through which the line passes and a socket in which the ferrule removably may be seated.

In use, the ferrule end of the line is wrapped around the end of a log. The ferrule is seated in the socket. The eye at the other end of the line is attached to a winch. The winch draws the loop tightly about the log and drags the log to the winch location.

Although widely used, the foregoing procedure is attended by several troublesome problems.

First, the choker line customarily is a stiff steel cable which must lie in the proper position before the ferrule may be seated in the choker hook socket. The necessary precise alignment of choker, cable and hook is particularly difficult to achieve because of the stiffness of the cable; the great weight of the logs; the random disposition of the logs; and the presence of brush, branches and other interfering debris.

Second, since the logs are dragged over the ground and the choker hook becomes embedded in the logs, the ferrule socket becomes fouled with bark and dirt so that removal of the ferrule at the end of the operation becomes very difficult.

Third, a serious wear problem exists where the cable enters the ferrule.

It accordingly is the general object of the present invention to provide a choker hook which easily is set for the reason that the ferrule may be inserted in the choker hook socket either endwise or sideways.

Further important objects of the present invention are provision of a choker hook which does not become fouled with dirt and bark; which holds the ferrule securely when in use; which is easily disconnected after each use; and which preserves the choker line from excessive wear.

Figure 6:
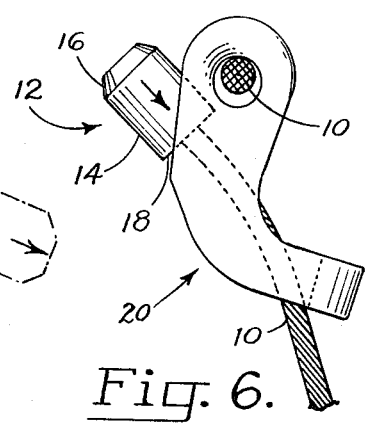
Figure 7:
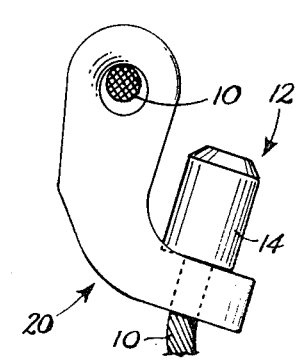
Figure 3:
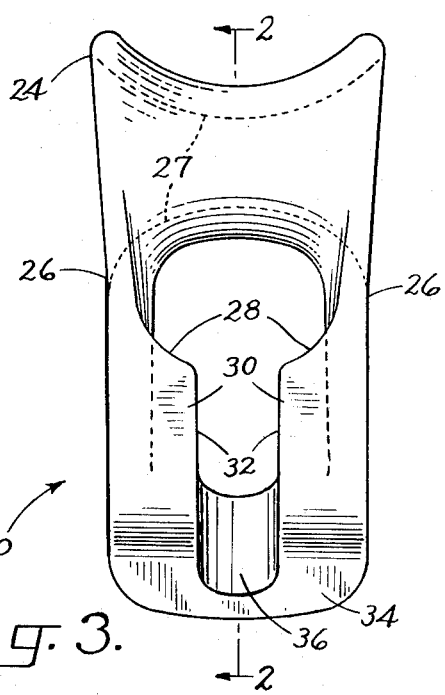
Figure 2:
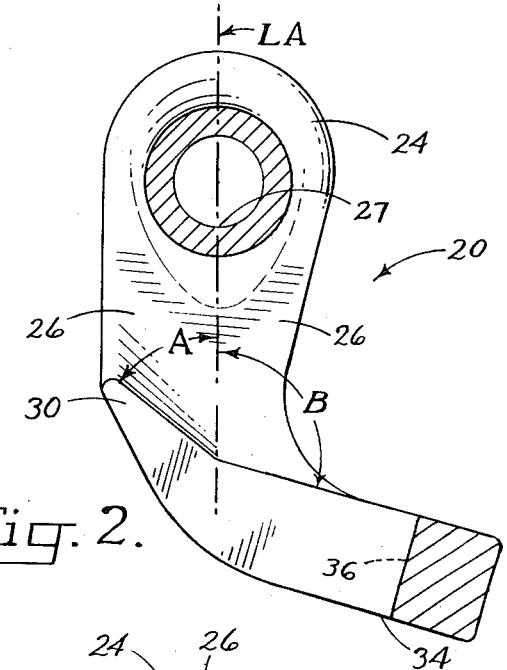
Figure 4:
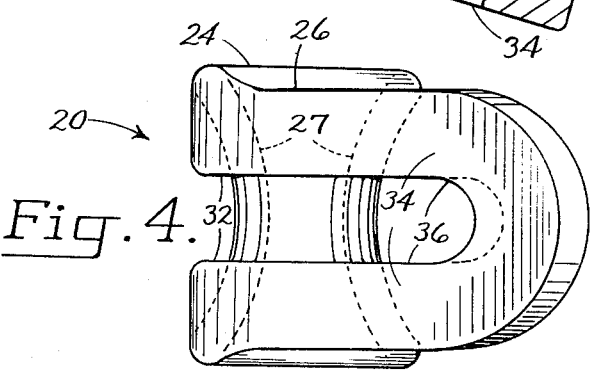
Figure 1:
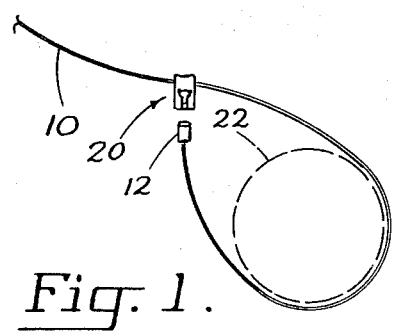

The manner in which the foregoing and other objects of this invention are accomplished will be apparent from the accompanying specification and claims considered together with the drawings, wherein:

FIG. 1 is a schematic view illustrating the manner of application of my choker hook during logging, FIGS. 2, 3, and 4 are views in side elevation, rear elevation, and bottom plan, respectively, of the hook, FIG. 2 being partly in section; and FIGS. 5, 6, and 7 are views in side elevation illustrating the manner of application of the hook, FIG. 5 illustrating the endwise insertion of the ferrule, FIG. 6 the sidewise insertion thereof, and FIG. 7 its engaged or use position.

FIG. 1 illustrates schematically a typical application of my choker hook.

A choker line consisting of a stiff steel cable 10 has swaged to its outer end a ferrule 12. The ferrule has a cross section greater than that of the cable. It is fabricated from strong steel and includes a body portion 14, a tapered leading end 16 and a bearing shoulder 18, FIG. 6. A choker hook, indicated generally at 20, is mounted slidably on the cable.

The choker line is wrapped about the end of a log 22. Ferrule 12 is inserted in choker hook 20. The choker line then is drawn tight about the log and used to winch the log, or tow it with a tractor, to a desired location.

The novel construction of choker hook 20, and its operational features, are illustrated in detail in FIGS. 2, 3 and 4.

The hook comprises a massive steel casting having on one end a slip sleeve 24. The slip sleeve has an opening 27 dimensioned to receive cable 10 in sliding relation. Its ends are flared outwardly to permit easy entry of cable 10 and to minimize the possibility of wedging bark and other debris in the opening during use of the cable.

Formed integrally with slip sleeve 24 are a pair of side walls 26. The side walls extend outwardly from the sleeve substantially at right angles to it, i.e., at right angles to the sleeve opening. The side walls are substantially parallel to each other and are spaced apart sufficiently to define, at their inner portions, an opening 28 of sufficient dimensions to pass not only cable 10, but also ferrule 12.

Sidewalls 26 carry along their outer sides a pair of flanges 30. The flanges extend inwardly toward each other and define a slot 32 dimensioned to pass cable 10, but not ferrule 12.

The flanges serve dual functions: they guide ferrule 12 into the ferrule socket during application of the choker cable, and help retain the ferrule in the socket during operation of the cable.

To this end the inner surfaces of flanges 30 are tapered upwardly in the outward direction, as viewed in FIG. 2. Although the degree of taper is somewhat variable, it generally and preferably is determined by an angle A of from 20° to 60°, with respect to the longitudinal axis LA of the hook.

A floor 34 extends outwardly from the outerends of the side walls transversely thereto and transversely to the sleeve. The floor extends outwardly a substantial distance so that it is offset substantially laterally from the sleeve.

Floor 34 is provided with a central slot 36 which merges with slot 32 defined by flanges 30. The two slots merge in substantially linear relation. Slot 36, like slot 32, is dimensioned to pass cable 10 but not ferrule 12.

The inner bearing surface of floor 34 is sloped downwardly and outwardly, as shown particularly in FIG. 2. The degree of slope is important since it determines not only the ease of mounting of ferrule 12, but also the location of the ferrule during use of the choker hook. Preferably, the angle B of the slope should be from 95°–110° with reference to the longitudinal axis LA of the hook, FIG. 2.

Side walls 26, flanges 30, and floor 34 thus define a ferrule socket dimensioned to receive the ferrule with its inner bearing shoulder 18 bearing against the outwardly sloped inner surface of floor 34. When cable 10 is drawn taught, the ferrule thus is maintained in its working position removed from eye 28, so that it can not inadvertently bounce out.

The manner of use of the herein described choker hook is illustrated in FIGS. 5, 6, and 7.

As has been set forth above, it is a primary feature of the invention that the ferrule may be introduced either endwise, as shown in FIG. 5, or sideways, as shown in FIG. 6, depending upon the relative positions of the choker line and log when the hookup is being made.

In the endwise insertion of the ferrule, the ferrule and adjacent cable segment are inserted endwise as shown in FIG. 5 until the ferrule has penetrated the hook completely. The cable then is swung counter-clockwise and pulled tight until the FIG. 7 position is attained.

In the sideways insertion of the ferrule, the ferrule and adjacent cable are placed in their FIG. 6 position with the ferrule aimed angularly at eye 28 and the cable inserted in registering slots 32, 36.

Upon tensioning the cable and moving it clockwise, the ferrule first moves endwise through the guideway formed by sidewalls 26 and flanges 30 until it has cleared the slip sleeve completely. Angular clockwise movement of the cable coupled with continued application of tensioning force, then draws the ferrule to its FIG. 7 operational position.

As the heavy log is drawn along the ground, the ferrule remains securely mounted within the hook. Even though it bounces with uneven application of force, it continually is urged outwardly by the outwardly sloping surface of floor 34 so that it does not bounce out of eye 28. In addition, wear on the cable is kept at a minimum, as is wedging of bark, dirt and other debris into the ferrule socket. Accordingly at the conclusion of the operation the ferrule may be removed from the hook with a minimum of effort.

Having thus described my invention in preferred embodiments, I claim as new and desire to protect by letters patent;

1. A choker hook for use on a choker cable provided with an end ferrule having a cross section greater than the cross section of the cable, the choker hook comprising a, a slip sleeve dimensioned to receive the cable, b, a pair of substantially parallel walls extending substantially perpendicularly outwardly from the slip sleeve and spaced apart sufficiently to provide between their inner portions an eye dimensioned to pass the ferrule, c, a pair of flanges extending inwardly toward each other from the outer portion of the side walls and defining a slot dimensioned to pass the cable, but not the ferrule, the flanges sloping upwardly in the outward direction for guiding the ferrule into the socket, the slope of the flanges being from 20–60° with reference to the longitudinal axis of the hook, d, a floor extending outwardly from the outer ends of the side walls transversely thereto and to the sleeve, the inner bearing surface of the floor being downwardly inclined in the outward direction, its slope being from 95°–110° with reference to the longitudinal axis of the hook, e, the floor having a central slot merging with the slot between the side walls and dimensioned to pass the cable, but not the ferrule, f, the side walls, flanges and floor defining a socket dimensioned for receiving the ferrule during the use of the choker hook.

* * * * *